United States Patent
Cook et al.

(10) Patent No.: US 7,138,794 B1
(45) Date of Patent: **\*Nov. 21, 2006**

(54) DETECTION OF FAULTS IN LINEAR AND ROTARY VOLTAGE TRANSDUCERS

(75) Inventors: Kenneth F. Cook, Cincinnati, OH (US); Robert D. Wittenbach, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,563

(22) Filed: Mar. 10, 2000

(51) Int. Cl.
*H02H 3/26* (2006.01)
*G01R 33/00* (2006.01)
*G01B 7/00* (2006.01)

(52) U.S. Cl. .................... 324/207.18; 324/207.12; 324/511; 361/78

(58) Field of Classification Search ............ 324/117 H, 324/117 R, 207.12, 207.18, 207.24, 207.16, 324/207.19, 511; 361/78
See application file for complete search history.

(56) References Cited

U.S. PATENT DOCUMENTS 5,109,675 A   5/1992   Hwang
5,180,979 A * 1/1993   Frazzini et al. ........ 324/207.18
5,235,274 A * 8/1993   Frazzini et al. ........ 324/207.12
5,777,468 A * 7/1998   Maher ................... 324/207.18
6,205,009 B1* 3/2001   Clark et al. .................. 361/78

FOREIGN PATENT DOCUMENTS

GB         2 068 124 A         8/1981

OTHER PUBLICATIONS

European Search Report, three pages, Jun. 22, 2001.

\* cited by examiner

*Primary Examiner*—Paresh Patel
(74) *Attorney, Agent, or Firm*—William Scott Andes; Armstrong Teasdale LLP

(57) ABSTRACT

Systems and methods for detecting faults in RVDTs and LVDTs are described. In an exemplary embodiment, a sum of secondary voltages V1 and V2 from a transducer is obtained by adding the secondary voltages together, i.e.; V1+V2. This sum of secondary voltages theoretically should be constant for all LVDT/RVDT positions, since the total length of the secondary transformer is constant. An electrical fault in the primary or secondary windings generates a corresponding change in the sum of secondary voltages. By comparing this shifted value to a reference value which is representative of a no-fault condition, an error value is created which indicates the magnitude of the shift in the sum of the secondary values. Depending upon the magnitude of the error value, certain actions are taken.

18 Claims, 2 Drawing Sheets

DETECTION OF FAULTS IN LINEAR AND ROTARY VOLTAGE TRANSDUCERS

BACKGROUND OF THE INVENTION

The present invention relates generally to control systems for position sensing, and more specifically, to detecting faults in linear variable differential transformers and rotary variable differential transformers.

Position sensors are utilized in many different applications, including in gas turbine engines for aeronautical, marine, and industrial applications. Such engines often include, for example, rotary voltage differential transducers (RVDTs) and linear voltage differential transducers (LVDTs). The transducers are coupled to actuators, and provide a voltage signal proportional to a stroke position of the actuator.

To detect faults in RVDTs and LVDTs, a range test can be performed on the sum of secondary voltages from the transducers. A range test also can be performed on a sensed position to verify signal integrity. The range limits, however, must be set wide enough to account for all worse-case system variations. Otherwise, a properly operating transducer may be identified as having a fault. These wide range limits result, however, in detecting only extreme faults due to electrical open circuits or short circuits. Failures which cause only minor shifts in the sensed position value may not necessarily be detected, even though such failures can impact control system operation.

BRIEF SUMMARY OF THE INVENTION

Methods and systems for detecting faults in RVDTs and LVDTs are described. In an exemplary embodiment, a sum of secondary voltages V1 and V2 from a transducer is obtained by adding the secondary voltages together, i.e., V1+V2. This sum of secondary voltages theoretically should be constant for all LVDT/RVDT positions, since the total length of the secondary transformer is constant. An electrical fault in the primary or secondary windings generates a corresponding change in the sum of secondary voltages. By comparing this shifted value to a reference value which is representative of a no-fault condition, an error value is created which indicates the magnitude of the shift in the sum of the secondary values.

Depending upon the magnitude of the error value, certain actions are taken. For example, if the error value is above a first threshold, then the reference value representative of a no-fault condition is maintained constant. If the error value is above a second threshold, then a fault indication signal is generated. If the error value is between the first and second threshold values, then a confidence factor is generated which indicates the confidence level that a fault has occurred.

DETAILED DESCRIPTION OF THE INVENTION

Figure 1:
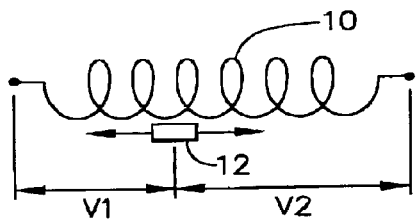
FIG. 1 is a schematic illustration of a secondary winding of an LVDT and an RVDT.

Generally, as shown in FIG. 1, an LVDT includes a secondary winding 10, and a movable core 12 within the LVDT that affects the output voltages V1 and V2. The sum of the voltages V1 and V2, however, remains constant provided there are no faults in windings 10. A secondary winding of an RVDT is configured identical to secondary winding 10 shown in FIG. 1.

In accordance with one embodiment of the present invention, a sum of secondary voltages V1 and V2 is obtained by adding the secondary voltages together, i.e., V1+V2. Again, this sum of secondary voltages theoretically should be constant for all LVDT/RVDT positions, since the total length of the secondary transformer is constant. An electrical fault in the primary or secondary windings will generate a corresponding change in the sum of secondary voltages. By comparing this shifted value to a reference value which is representative of a no-fault condition, an error value is created which indicates the magnitude of the shift in the sum of the secondary values.

Figure 2:
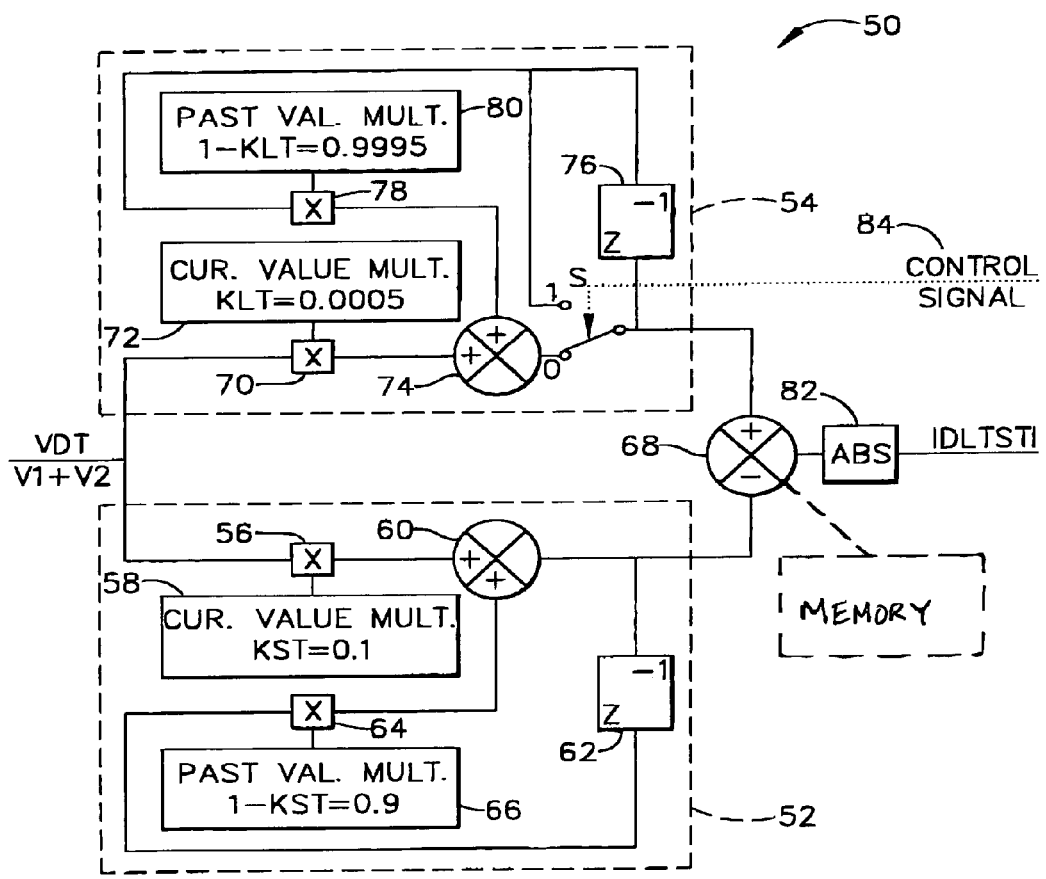
FIG. 2 is a schematic illustration of determining a value representative of whether a fault has occurred in an LVDT/RVDT.

There are many possible logic circuits that could be used to determine whether the sum of secondary voltages indicates an error in the LVDT or RVDT. FIG. 2 is a schematic illustration of one exemplary circuit 50 that can be used. The logic illustrated in FIG. 2 can, for example, be implemented in an on-board interface board electrically connected between a transducer and a controller. Alternatively, the logic circuit could form part of an on-board controller.

More specifically, and referring to FIG. 2, the secondary voltages from a transducer are denoted as V1 and V2. The summed value, V1+V2, is fed to two separate simple one pole lag filters, i.e., a short term filter 52 and a long term filter 54. Short term filter 52, in an exemplary embodiment, has a time constant of 0.150 seconds. The output of short term filter 52 is summed signal V1+V2 with high frequency noise removed and represents the current value of V1+V2.

Short term filter 52 includes a multiplier 56 which multiplies the summed value by a short term weight factor 58. In an exemplary embodiment, the short term weight factor KST is 0.1. The weighted sum is then added at a summer 60 with a weighted value from a most previous sum. Specifically, the previous short term sum value 62 is multiplied at a multiplier 64 by a weighting factor 66. In the exemplary embodiment, this weighting factor is 0.9. This weighted value is added at summer 60 with the current weighted value to provide a short term sum value. This current short term sum value is supplied to a summer 68. The current short term sum value also is stored in memory (not shown) so that it can be used in determining the next current short term sum value.

Long term filter 54, in an exemplary embodiment, has a time constant of 30 seconds. The output of long term filter 54 represents the recent non-faulted reference value of V1+V2. In long term filter, switch S normally is in the position shown, i.e., position 0.

More specifically, long term filter 54 includes a multiplier 70 which multiplies the summed value by a long term weight factor 72. In an exemplary embodiment, the long term weight factor KLT is 0.0005. The weighted sum is then added at a summer 74 with a weighted value from a most previous sum. Specifically, the previous long term sum value 76 is multiplied at a multiplier 78 by a weighting factor 80. In the exemplary embodiment, this weighting factor is 0.9995. This weighted value is added at summer 74 with the current weighted value to provide a long term sum value.

This long term sum value is supplied to summer 68. The current long term sum value also is stored in memory (not shown) so that it can be used in determining the next current long term sum value. In one embodiment, a comparator (not shown) is coupled to summer 68.

Again, the output of short term filter 52 is continuously summed at summer 68 with the output of long term filter 54. An absolute value 82 of this sum is obtained and is designated as DLTST (i.e., difference between long term and short term filters 52 and 54. Depending upon the value of DLTST, certain actions may be taken as described below.

Specifically, in an exemplary embodiment, if the absolute value of DLTST exceeds 0.05 Vrms, then the output of long term filter 54 should be frozen, i.e., a control signal 84 should transition switch S from position 0 to position 1. This results in freezing the value of long term filter and the reference value from long term filter 54 remains constant, i.e., value 76. This relationship is represented below.

If DLTST>LTfreezeThresh
The LTfreeze=1
Else LTfreeze=0,
where, LTfreezeThresh=0.05, and where LtfreezeThresh represents a long term filter freeze threshold.

If the absolute value of DLTST exceeds 0.08 Vrms, then a fault indication VDTFLT should be set. This relationship is represented below.

If DLTST>V1+V2FLTThresh,
Then VDTFLT=1,
Else VDTFLT=0,
where, V1+V2FLTThresh=0.08, and where V2FLTThresh represents a fault threshold value.

If the absolute value of DLTST is less than 0.08 Vrms, the fault indication should not be set. As the absolute value of DLTST changes between 0.04 Vrms and 0.08 Vrms, a confidence factor is generated which varies between 1.0 and 0.0, respectively. For absolute values of DLTST less than 0.04 Vrms, the confidence factor should be 1.0, e.g., confident that no fault has occurred. For absolute values of DLTST values greater than 0.08 Vrms, the confidence factor should be 0.0, e.g., not confident that no fault has occurred. The confidence factor can be utilized in a control system to minimize the effect of an LVDT/RVDT failure.

Figure 3:
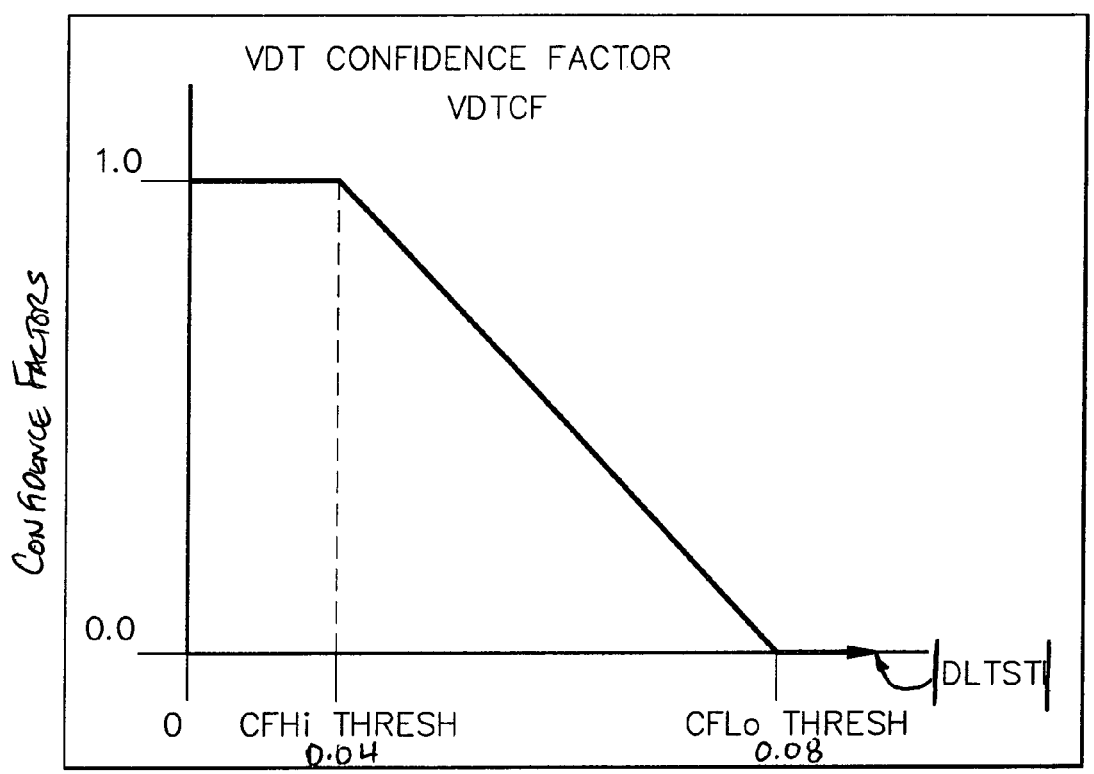
FIG. 3 is a graph illustrating values of an exemplary confidence factor.

An exemplary confidence factor is illustrated in a graph shown in FIG. 3. As shown in FIG. 3, when the Vrms value of the absolute value of DLTST is less than CFHiThresh, then a confidence factor of 1 is assigned. When the Vrms value of the absolute value of DLTST is greater than CFLoThresh, then a confidence factor of 0 is assigned. For Vrms values of the absolute value of DLTST between CFHiThresh and CFLoThresh, a linear relationship between the Vrms value and the confidence factor is provided. Exemplary values of CFHiThresh and CLFoThresh are set forth below.

While the invention has been described in terms of various specific embodiments, those skilled in the art will recognize that the invention can be practiced with modification within the spirit and scope of the claims.

What is claimed is:

1. A method for detecting faults in a transducer including a secondary winding having at least two voltage outputs, the transducer being electrically connected to a logic circuit, said method comprising the steps of:
   summing the voltage outputs to obtain a summed voltage value;
   determining a difference between a current value of the summed voltage value to a reference value;
   if an absolute value of the difference between a current value of the summed voltage value and the reference value exceeds a freeze threshold, then maintaining the reference value constant; and
   detecting faults in at least one of a rotary voltage differential transducer (RVDT) and a linear voltage differential transducer (LVDT) based on the determined absolute value.

2. A method in accordance with claim 1 wherein if the absolute value of the difference between a current value of the summed voltage value and the reference value exceeds a default threshold, then generating a fault indicator signal.

3. A method in accordance with claim 2 wherein if the absolute value of the difference between a current value of the summed voltage value and the reference value is less than the fault threshold, then generating a confidence factor representing that a fault has occurred.

4. A method in accordance with claim 3 wherein the freeze threshold value is approximately equal 0.05 Vrms, and wherein the fault threshold value is approximately equal 0.08 Vrms.

5. A method in accordance with claim 1 wherein the reference value is representative of a value of a sum of the secondary voltages of the transducer under no faults.

6. Apparatus for detecting faults in a transducer including a secondary winding having at least two voltage outputs, the transducer being electrically connected to a logic circuit implemented in at least one of an on-board interface and an on-board controller, said apparatus comprising:
   a short term filter for generating a first voltage value representative of a current value of a sum of the secondary winding output voltages;
   a long term filter for generating a second voltage value representative of a non-faulted value of a sum of the secondary winding output voltages, at least one of said short term filter and said long term filter configured to maintain said second voltage value constant; and
   a summer for generating a difference signal representative of a difference between the first voltage value and the second voltage value, said apparatus configured to detect faults in at least one of a rotary voltage differential transducer (RVDT) and a linear voltage differential transducer based on the difference signal.

7. Apparatus in accordance with claim 6 wherein said short term filter comprises a one pole lag filter.

8. Apparatus in accordance with claim 7 wherein said one pole lag filter has a time constant of 0.150 seconds.

9. Apparatus in accordance with claim 6 wherein said long term filter comprises a one pole lag filter.

10. Apparatus in accordance with claim 9 wherein said one pole lag filter has a time constant of 30 seconds.

11. Apparatus in accordance with claim 6 wherein if an absolute value of the difference between the first voltage value and the second voltage value exceeds a freeze threshold, then said long term filter maintains said second voltage value constant.

12. Apparatus in accordance with claim 11 wherein if the absolute value of the difference between the first voltage value and the second voltage value exceeds a fault threshold, then said apparatus generates a fault indicator signal.

13. Apparatus in accordance with claim 12 wherein if the absolute value of the difference between the first voltage value and the second voltage value is less than the fault threshold, then said apparatus generates a confidence factor.

14. Apparatus in accordance with claim 12 wherein the freeze threshold value is approximately equal 0.05 Vrms, and wherein the fault threshold value is approximately equal 0.08 Vrms.

15. Apparatus for detecting faults in a transducer including a secondary winding having at least two voltage outputs, the transducer being electrically connected to a logic circuit implemented in at least one of an on-board interface and an on-board controller, said apparatus comprising:
- a short term filter for generating a first voltage value representative of a current value of a sum of the secondary winding output voltages, said short term filter comprising a one pole lag filter;
- a long term filter for generating a second voltage value representative of a non-faulted value of a sum of the secondary winding output voltages, said long term filter comprising a one pole lag filter; and
- a summer for generating a difference signal representative of a difference between the first voltage value and the second voltage value, if an absolute value of the difference between the first voltage value and the second voltage value exceeds a freeze threshold, then said long term filter maintains said second voltage value constant, and if the absolute value of the difference between the first voltage value and the second voltage value exceeds a fault threshold, then said apparatus generates a fault indicator signal, said apparatus configured to detect faults in at least one of a rotary voltage differential transducer (RVDT) and a linear voltage differential transducer based on the determined absolute value.

16. Apparatus in accordance with claim 15 wherein said short term one pole lag filter has a time constant of 0.150 seconds.

17. Apparatus in accordance with claim 15 wherein said long term one pole lag filter has a time constant of 30 seconds.

18. Apparatus in accordance with claim 15 wherein if the absolute value of the difference between the first voltage value and the second voltage value is less than the fault threshold, then said apparatus generates a confidence factor.

* * * * *